US008255378B2

(12) United States Patent
Ji et al.

(10) Patent No.: US 8,255,378 B2
(45) Date of Patent: Aug. 28, 2012

(54) NETWORK BASED DIRECTORY SERVICE FOR TERRESTRIAL BROADCASTS

(75) Inventors: Zhengrong Ji, Sunnyvale, CA (US);
Junlan Zhou, Sunnyvale, CA (US);
Tsuwei Chen, Cupertino, CA (US)

(73) Assignee: Google Inc., Mountain View, CA (US)

( * ) Notice: Subject to any disclaimer, the term of this patent is extended or adjusted under 35 U.S.C. 154(b) by 313 days.

(21) Appl. No.: 12/556,701

(22) Filed: Sep. 10, 2009

(65) Prior Publication Data

US 2011/0060760 A1    Mar. 10, 2011

(51) Int. Cl.
*G06F 17/30* (2006.01)
(52) U.S. Cl. ........................................ 707/706; 707/913
(58) Field of Classification Search .......... 707/705–706, 707/769, 913, 918; 725/35; 455/3.01, 3.02
See application file for complete search history.

(56) References Cited

U.S. PATENT DOCUMENTS

| | | | |
|---|---|---|---|
| 2003/0040272 A1 | 2/2003 | Lelievre et al. | |
| 2004/0029525 A1* | 2/2004 | Vertelney | 455/3.03 |
| 2004/0198217 A1* | 10/2004 | Lee et al. | 455/3.01 |
| 2004/0198279 A1* | 10/2004 | Anttila et al. | 455/179.1 |
| 2004/0266333 A1* | 12/2004 | Isobe | 455/3.01 |
| 2007/0142055 A1 | 6/2007 | Toivanen et al. | |
| 2007/0207815 A1* | 9/2007 | Alfano et al. | 455/456.1 |
| 2008/0020702 A1* | 1/2008 | Jendbro et al. | 455/3.01 |

FOREIGN PATENT DOCUMENTS

| | | |
|---|---|---|
| EP | 1 753 228 | 2/2007 |
| GB | 2 427 289 | 12/2006 |

OTHER PUBLICATIONS

Authorized Officer S. Baharlou. International Preliminary Report on Patentability in International Application No. PCT/US2010/048473, mailed Mar. 22, 2012, 8 pages.

* cited by examiner

*Primary Examiner* — Thu-Nguyet Le
(74) *Attorney, Agent, or Firm* — Fish & Richardson P.C.

(57) ABSTRACT

Methods and apparatus, including computer program products, implementing and using techniques for providing access for a networked device to a directory service for terrestrial broadcasts. A networked-based directory service that includes broadcasting data for one or more broadcasting stations within various geographical locations is provided. The broadcasting data includes tuning information that enables receivers to tune in one or more terrestrial broadcasts transmitted by the one or more broadcasting stations. A request is received from a networked device to obtain information about an availability of terrestrial broadcasts at a geographical location of the networked device. The directory service is queried using the geographical location as a query parameter. A response is transmitted to the networked device. The response includes tuning information that enables a receiver to automatically tune to one or more terrestrial broadcasts associated with the geographical location of the networked device.

21 Claims, 6 Drawing Sheets

NETWORK BASED DIRECTORY SERVICE FOR TERRESTRIAL BROADCASTS

BACKGROUND

The subject matter herein relates to portable communication devices. Recently, technologies have been developed that allow users of mobile phones and other types of portable communication devices listen to radio broadcasts, or even view television broadcasts, on their devices. Due to the diversity in frequency allocation and management policies across regions, radio networks, and countries, a user must typically tune her device to receive service as she moves across network boundaries. This is generally done either through a manual or automatic scanning functionality.

However, as the user often is not familiar with the station directories and allocations at the new region, the most common way of tuning the device is to search the entire radio spectrum (such as FM, or AM radio) with "brute force." This introduces significant delay unless user already has prior knowledge of the exact station of her choice and the exact channel of the station. Even for digital stations which have the capability of including directory information in the form of meta-data in their broadcasts this remains a problem, because there is generally no incentive for a network to provide directory service for a competing network in the same region.

Directory information is, however, publicly available. A typical Internet search engine, such as the search engine provided by Google Inc. of Mountain View, Calif., can return links to community websites that list all the radio stations in various local regions. In the United States, the Federal Communications Commission (FCC) also requires broadcasters to register their tower information in a publicly available database. Thus, while station directories do exist, they are typically not easily available in a situation where a user needs to tune her device to a particular station.

Satellite based broadcasting stations typically make available their own lists of stations on a dedicated channel via a satellite. However, this is because satellite companies are nationwide broadcasters, which also serve local content (such as local news for a particular region). The satellite broadcasting stations do not provide local directories for their terrestrial network competitors. Cable providers serve regional users (e.g., by broadcasting local television stations) but accessing the cable broadcasts requires a cable connection, which is not feasible for mobile users who typically rely on an air interface.

SUMMARY

The present description provides methods and apparatus for providing access for a networked device to a directory service for terrestrial broadcasts. In general, in one aspect, the various embodiments provide methods and apparatus, including computer program products, for implementing and using techniques for providing access for a networked device to a directory service for terrestrial broadcasts. A networked-based directory service that includes broadcasting data for one or more broadcasting stations within various geographical locations is provided. The broadcasting data includes tuning information that enables receivers to tune in one or more terrestrial broadcasts transmitted by the one or more broadcasting stations. A request is received from a networked device to obtain information about an availability of terrestrial broadcasts at a geographical location of the networked device. The directory service is queried using the geographical location as a query parameter. A response is transmitted to the networked device. The response includes tuning information that enables a receiver to automatically tune to one or more terrestrial broadcasts associated with the geographical location of the networked device.

Implementations can include one or more of the following features. The receiver can be included in the networked device. The networked device can be a mobile device or a stationary device. The networked device can be a cell phone, a radio, a television, a computer, or a portable digital media player. The terrestrial broadcasts can be radio broadcasts or television broadcasts. The network-based directory service can be a global directory service accessible from any geographical location on planet Earth from which geographical location the networked device is able to access the service. The broadcasting data can include real-time broadcasting data or static broadcasting data. The real-time broadcasting data for each of the one or more broadcasting stations can include a current program schedule or a current program being broadcast by the station. The static broadcasting data for each of the one or more broadcasting stations can include: a name of the broadcasting station, a type of the broadcasting station, a code name for the broadcasting station, a language of the broadcasting station, a target audience for the broadcasting station, a station genre for the broadcasting station, a receiver type to be used for receiving broadcasts from the broadcasting station, a frequency spectrum used by the broadcasting station, tower locations for the broadcasting station, antenna transmit power for the broadcasting station, antenna height for the broadcasting station, or geographical coverage for the broadcasting station.

The geographical location for the networked device can be determined through a cellular network identifier, a wireless access point media access control address, a set of global positioning system coordinates, or a navigational system. Providing a networked-based directory service can include: providing a broadcasting stations database serving as a repository for broadcasting data for the one or more broadcasting stations; providing a relational database serving as a repository for the correlation of geographical location data with the broadcasting data in the broadcasting stations database; and providing a directory service application program interface through which the networked device can submit queries to and receive responses from the broadcasting stations database and the relational database. The broadcasting stations database and the relational database can be populated with geographical location data and broadcasting data using a vehicular crawler, an authorized station upload interface, a station crawler, or the networked device.

The vehicular crawler can populate the broadcasting stations database and the relational database by: traveling along a path to various geographical locations and collecting broadcasting data for one or more broadcasting stations available along the path; recording geographical location data along the path to be correlated with the broadcasting data; and uploading the collected broadcasting data and geographical location data to the broadcasting stations database and the relational database. The vehicular crawler can record a portion of one or more ongoing broadcasts and upload the recordings to the broadcasting stations database and the relational database.

The authorized station upload interface can populate the broadcasting stations database and the relational database by: receiving uploads of broadcasting data from broadcasting stations through a secure and authenticated network interface, and uploading the received broadcasting data to the broadcasting stations database and the relational database. The station crawler can populate the broadcasting stations database and the relational database by searching the Internet to identify websites containing information about broadcasting data, extracting pertinent broadcasting data from the identified websites, and uploading the extracted broadcasting data to the broadcasting stations database and the relational database. The networked device can populate the broadcasting stations database and the relational database by collecting broadcasting data for one or more broadcasting stations available at the geographical location of the networked device, and upload the collected broadcasting data to the broadcasting stations database and the relational database.

Populating the broadcasting stations database and the relational database can include processing uploaded broadcasting data and geographical location data to estimate a geographical footprint for each broadcasting station, and storing the geographical footprint for each broadcasting station in the relational database. Receiving a request from the networked device can occur in response to a user turning on or otherwise activating the networked device. The request can include user preferences in addition to geographical location information. Transmitting a response can include transmitting a response that contains only information satisfying the user preferences in the request. By querying the directory service, it can be determined whether a broadcast of higher quality is available compared to a broadcast that is currently received by the networked device, and in response to determining that a higher quality broadcast is available, a user of the networked device can be notified of the availability of the higher quality broadcast.

In general, in another aspect, the various embodiments provide systems for providing access for a networked device to a directory service for terrestrial broadcasts. The system includes a networked-based directory service and a directory service application program interface. The networked-based directory service includes broadcasting data for one or more broadcasting stations within various geographical locations. The broadcasting data includes tuning information that enables receivers to tune in one or more terrestrial broadcasts transmitted by the one or more broadcasting stations. The directory service application program interface receives a request from a networked device to obtain information about an availability of terrestrial broadcasts at a geographical location of the networked device; queries the directory service using the geographical location as a query parameter; and transmits to the networked device a response that includes tuning information that enables a receiver to automatically tune to one or more terrestrial broadcasts associated with the geographical location of the networked device.

Various implementations can include one or more of the following advantages. The user experience is improved for any type of networked device that is equipped with a terrestrial broadcast radio or television receiver, or similar equipment that receive a terrestrial broadcasting services. In particular, the user experience is improved in terms of device initialization or re-initialization and seamless handoff within or across broadcasting service providers. The networked device applications are tailored to the user preferences with a minimal amount of user intervention. The directory service can be used to publish the available unallocated spectrums (such as TV white space) at various geographical locations. Networked devices can subscribe to the directory service upon initial startup or on re-initialization to avoid using bands that are already assigned to other networked devices in the same region. No matter where a user travels across the globe, the directory service is accessible, provided that the user's networked device is capable of receiving terrestrial broadcasts and has the capability to interface with the directory service. Statistics pertaining to user viewing or listening patterns can be collected and be used by network operators, for example, to optimize broadcasts in certain geographical areas or to optimize contents of the broadcasts during certain hours of the day, etc. Such information can also be used to improve the relevance of advertisements pushed to the user's networked device. For example, the advertisements can be synchronized with the program that the user is listening to or viewing, such that advertisements shown during commercial breaks are more personalized and relevant compared to standard, over-the-air commercials in conventional radio or television broadcasts.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Overview

In accordance with various implementations, a network-based directory service is provided for terrestrial broadcasting, such as terrestrial radio and television broadcasting networks. The directory service can improve the user experience on networked devices with respect to device initialization or re-initialization, seamless handoff within or across broadcasting service providers, and automatic tailoring of the networked device applications to the user's preferences, with a minimal amount of user intervention.

The various implementations become technically feasible and applicable due to an increasing integration of portable broadcasting receivers into alternative bidirectional access networks, such as cellular networks and WiFi™ networks, etc. For example, modern mobile phones often have integrated FM radios. Some mobile phones are even equipped with micro TV receivers, such as DVB-T (Digital Video Broadcasting-Terrestrial) tuners. As will be described in further detail below, the various implementations of the directory service can provide services to all broadcasting networks around the world, so that no matter where the user travels, the directory service is available, provided that his networked device is capable of receiving the broadcasts and communicating with the directory service. Furthermore, as will also be described below, various implementations can be easily tailored to a specific broadcasters or networks, portable device manufacturers, alliance groups, etc.

Figure 1:
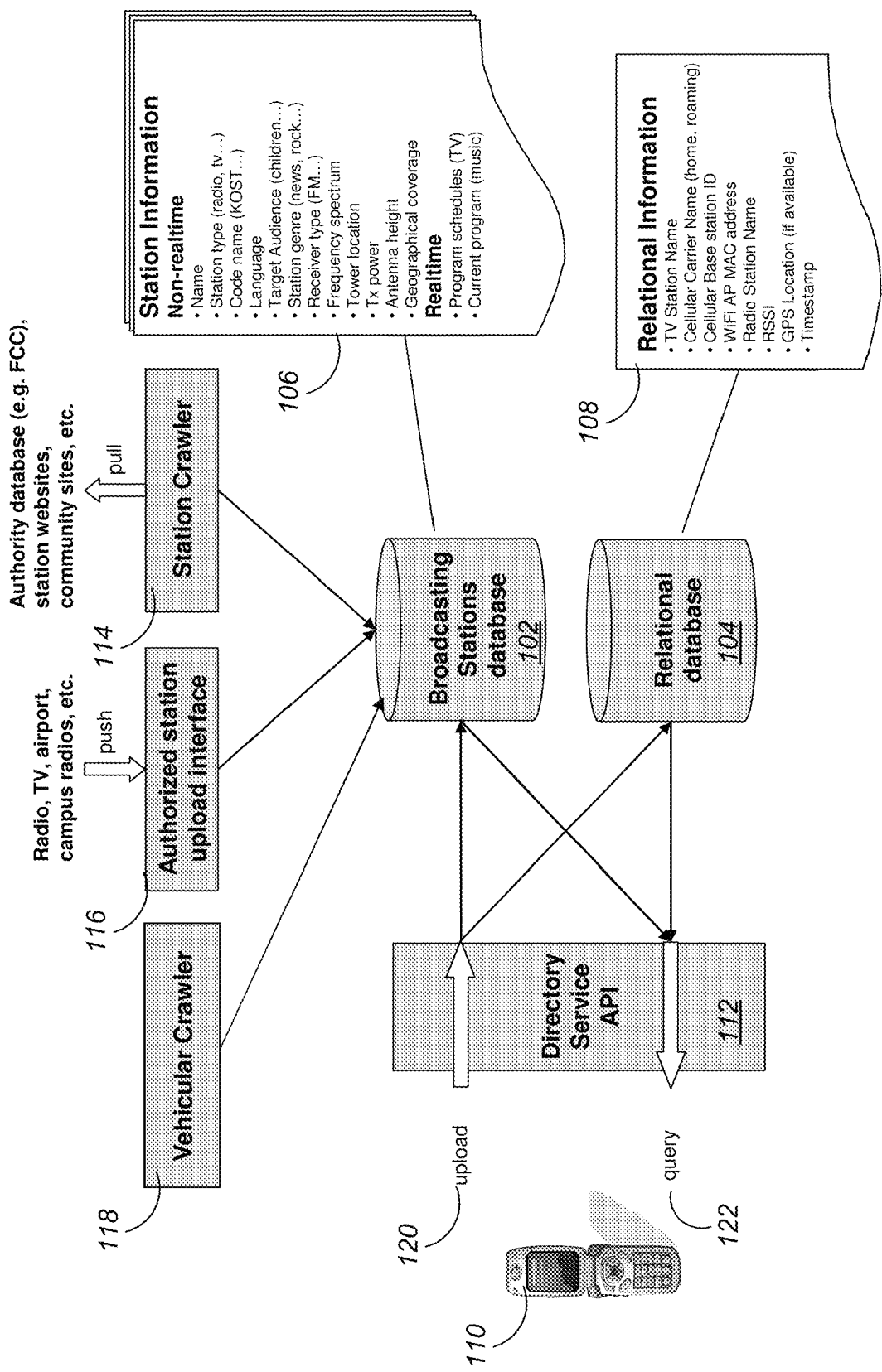
FIG. 1 shows schematic overview of a system in which a directory service can be implemented, in accordance with one implementation.

An exemplary overview of a system (100) for a directory service in accordance with one implementation will now be described with reference to FIG. 1. As can be seen in FIG. 1, the system (100) includes a broadcasting stations database (102) and a relational database (104). The broadcasting stations database (102) serves as a central repository of the information about all public broadcasting stations, such as FTA (Free-To-Air) radios. An example of the information contained in the broadcasting stations database (102) is illustrated in the Station Information section (106) of FIG. 1. The information can include static (i.e., non-real-time) information, such as the name of the station, the type of station, the code name for the station, language, a target audience, a station genre, a receiver type, a frequency spectrum used by the station, the station's tower locations, transmit power, antenna height, geographical coverage, etc. The detailed information can also include real-time information, i.e., information that changes dynamically over time, such as a current program schedule and a current program being broadcast by the station. As will be described in further detail below, the static and real-time information may improve the speed of set up of a networked device's (110) receiver radios, for example, by populating the channel list and radio parameters and/or improving the relevance of list of local broadcasting stations to the user, for example, based on language, genre, and program schedule.

The relational database (104) captures a collocating relationship (e.g., overlapping areal coverage) among different fixed entities. Such fixed entities can include a radio/TV station identified by a unique station ID, a Cellular network sector uniquely identified by a CGI (Cell Global Identity), or a WiFi™ access point uniquely identified by its 48-bit MAC (Media Access Control) address. Collocating relationships can be identified based on the physical properties of the entities. For example, a WiFi™ access point situated one block away from an omni-directional radio tower suggests that the areal WiFi™ access point and radio tower have a collocating relationship. Collocating relationship can also be deduced through direct detection by a networked device (110). For example, if a networked device (110) reports that it is connected to a cellular base station A of a carrier, while at the same time the networked device (110) is receiving music from a music station B, such a report indicates that stations A and B have a collocating relationship. Thus, from a non-broadcast station entity reported by the networked device (110), such as a cellular network sector in which the networked device (110) currently resides, or a WiFi™ access point with which the networked device (110) is associated, it is possible to infer the nearby radio/TV broadcast stations and determine the list of stations that have coverage at the user's current location. As can be seen in FIG. 1, such relational information (108) can include, for example, a TV station name, a cellular carrier name, a cellular base station ID, a WiFi™ AP (Access Point) MAC address, a Radio station name, RSSI (Received Signal Strength Indication), GPS (Global Positioning System) location, a timestamp, etc., all of which are essential information in a report provided by a networked device (110).

The networked device (110) can communicate with the two databases (102; 104) through a directory service application program interface (112). The databases (102; 104) can be populated through a variety of mechanisms, such as a station crawler (114), an authorized station upload interface (116), a vehicular crawler (118), or through mobile upload (120). All of these different mechanisms will be described in further detail below. The relational database (104) captures the physical proximity between the station coverage and network system coverage, such as a cellular sector, and estimates the physical area coverage of the station. When user turns on his networked device (110), the networked device (110) has no prior knowledge of the local station information, but it does have information about the user's current location (e.g. cellular network ID, WiFi™ MAC address, or even a GPS location if the networked device (110) includes a GPS receiver). By using such information, the directory service (112) can query the relational database (104) to determine the relevant broadcasting stations with coverage at the user's location. By combining the information in the relational database (104) and the broadcasting station database (102), the directory service (112) can look up detailed information of stations that are local to the user and send the information to the networked device (110).

The operation of the system (100) can be divided into two main processes; data collection and analysis of the collected data. The data collection can occur through out-of-band and in-band means, respectively. Out-of-band data collection does not require any participation of networked devices (110) that use the directory service, while in in-band data collection, the networked devices (110) directly contribute to the health of the databases (102; 104). It should be realized that while only one networked device (110) is shown in FIG. 1 for simplicity reasons, in a real-life scenario, there are thousands or even hundreds of thousands networked devices (110) in the system (100). Likewise, there may be many vehicular crawlers (118), station upload interfaces (116) and station crawlers (114), respectively.

The simplest form of out-of-band data collection is through the direct feedback from the broadcasting stations that wish to make their broadcasts easily accessible to the users of the networked devices (110). The station information is automatically published by the directory service API (112). A secure and authenticated web or other network interface (shown in FIG. 1 as the authorized station upload interface (116)) can be accessed by the broadcasting stations in order for the stations to update their information in the broadcasting stations database (102) either as a single event, or on a periodical basis.

Another form of out-of-band data collection is done through the special purpose station crawler (114). The station crawler (114) extracts station information from a number of sources, such as authority databases (e.g., the FCC radio tower database), worldwide community websites that maintain a set of active stations in a region or country, or websites of specific stations as an increasing number of radio and TV stations are available online, just to mention a few examples. The mechanisms used for the station crawler (114) to collect the information are similar to conventional types of so-called web crawlers, which are well known to those of ordinary skill in the art.

In-band data collection is directly contributed by the networked devices (110) that use the directory service. It should however be noted that while the networked device (110) is illustrated as a mobile device, the networked devices (110) can also include various types of stationary devices. The networked devices (110) are connected to a network (permanently or intermittently) to communicate with the directory service API (112). The networked devices (110) have the capability to play dual roles, either as a user of the directory service (query), or as provider of collected data (upload), as will be described below. Any networked device (110) can play one or both roles at any time or any location, based on the capabilities of the networked device (110) and the needs or actual implementation of the system (100).

The level of details in the information that a networked device (110) can contribute typically depends on the specific radio technology used in the networked device (110). For example, an analog radio tuner in a networked device (110) may only be able report back channel (frequency) information of a station, while a digital radio tuner in a networked device (110) may also be able to report details extracted from broadcast metadata by a digital broadcast station. It should be noted that even incomplete data, such as the frequency channel and location collected from networked device (110) with analog tuners, can be useful for various purposes, such as for ranking information collected by the station crawler (114). For example, data provided by the networked devices (110) can be used by the station crawler (114) to assess the relevance of, for example, a webpage that has been obtained from the Internet by the station crawler (114), as will be described in further detail below.

A separate process runs continuously on the server side to analyze the information collected and stored in the broadcasting stations database (102) and the relational database (104), to cleanse and index the data for use by the directory service. At the cleansing step, first, basic data filtering is performed to ensure the integrity of the data, which will now be described by way of example. Sometimes the collected data can contain locations from GPS receivers. Since GPS location data is not always accurate, and can in fact occasionally introduce large errors in urban environments, an outlier rejection filter can be used to eliminate inaccurate GPS data and result in a more accurate estimation of areal coverage or spatial map of signal strength of a broadcast station. In another example, certain types of data change more frequently than other data types, such as WiFi™ access points due to their relatively small areal coverage. Thus, in response to detecting a change of WiFi™ access points for a networked device (110), a data filter can establish relationships with new radio stations having service coverage at the new location of the access point, based on the stored collocation data. This can occur in real time, or on a periodical basis. A similar logic can be applied to cellular network re-organizations, though these typically occur with coarser time granularity due to their larger areal coverage.

In addition, at least two additional operations are performed. First, the partial data originating from the in-band collection by the networked devices (110) are complemented with corresponding matching data extracted by the station crawler (114). Second, collocating relationships in the relational database (104) are analyzed transitively and recursively, and augmented in each iteration until a relationship graph cannot be augmented further. The first operation is quite straight forward and can easily be implemented by those of ordinary skill in the art. Thus, the following section will focus on illustrating the transitive and recursive augmentation of relationships in the relationship graph of the second operation by means of an example.

Figure 6:
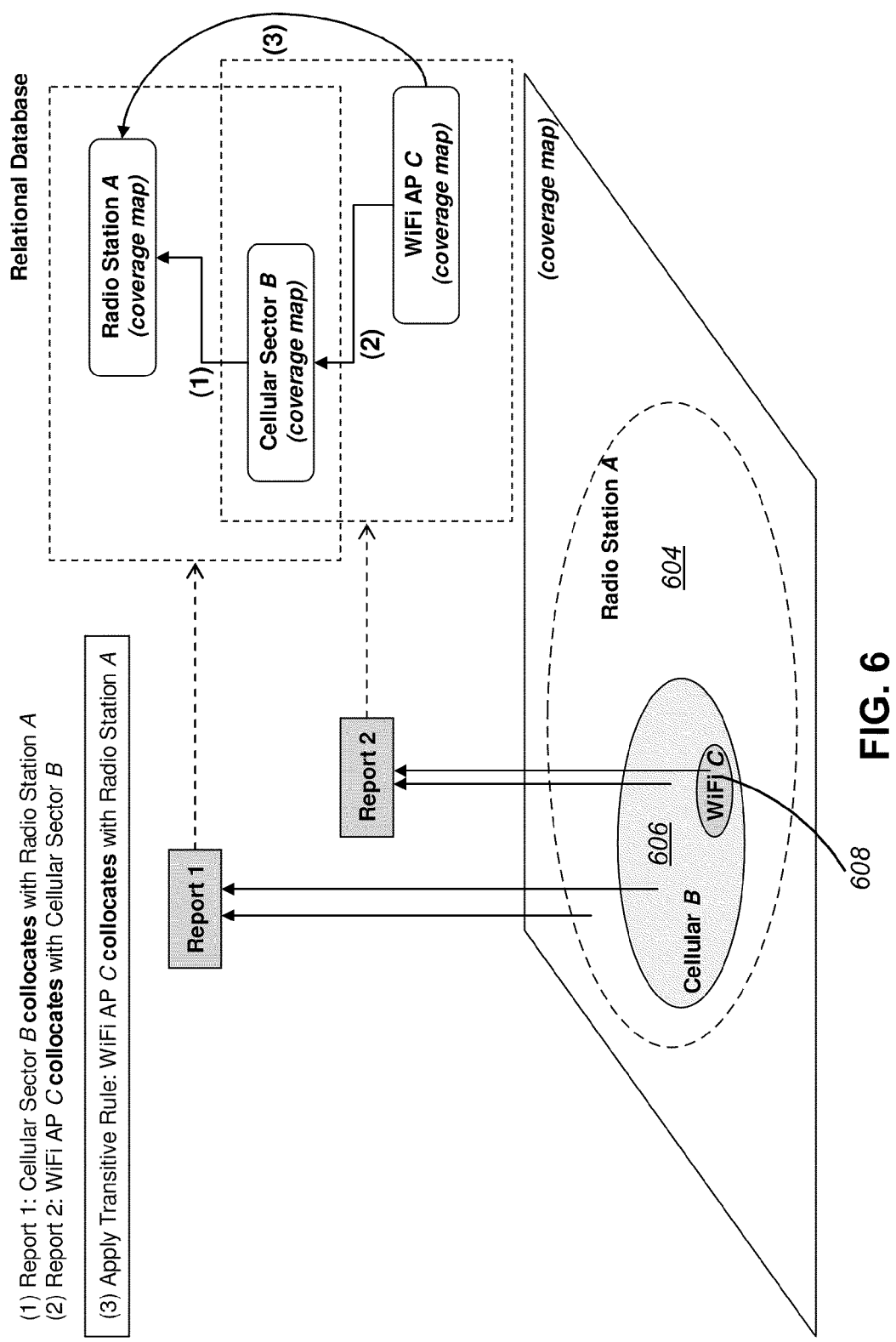
FIG. 6 shows a relational graph of a coverage area in accordance with one implementation.

As shown in FIG. 6, two reports (602) have been collected from the networked devices (110). The first report contains information on a radio station A (604) and a cellular sector B (606), while the second report contains information on a cellular sector B (606) and a WiFi™ access point C (608). In the first iteration, the first report is processed and it is concluded that cellular sector B (606) collocates with radio station A (604) with high probability, based on the received reports. In the next iteration, the second report is processed, which processing concludes that WiFi™ access point C (608) collocates with cellular sector B (606). In the following iteration, the collocation relationships can be applied transitively because the WiFi™ service region is covered by the cellular sector, and in turn covered the ratio station. Hence, WiFi™ access point C (608) collocates with radio station A (604). The operation then terminates, as there are no additional collocating relations to be found in the report data. The final relational graph therefore consists of three entities, A, B, and C, and three collocating relations, as illustrated in FIG. 6. Further, if the geographical coverage of an entity can be estimated based on the in-band and out-of-band collection, the geographical coverage can also be stored in the entity as a polygon set or other representation of a coverage map.

Thus, in summary, the relational graph stores all the discoverable information about the station, or a geographical context, such as an explicitly stated geographical region, or an implicit geographical representation such as a cellular network ID. An edge of the graph represents a collocating relationship between the two nodes connected by the edge. At the indexing step, the graph is indexed by the node IDs so that the neighbors in the graph can be found efficiently. For example, from a WiFi™ access point reported by a networked device (110), the graph can be easily traversed to locate all the radio stations that cover the service region of the WiFi™ access point. Similarly, with a spatial index built on the polygonal or other state of the art representation of coverage maps, it is possible to find the radio stations that cover a particular coordinate on the surface of the earth.

To support the directory service, a secure API (112) is exposed to the networked devices (110), so that upon initialization or periodic re-initialization of a networked device (110), the networked device (112) uses information available at the time of directory lookup, such as a cellular network ID, or a WiFi™ access point's MAC address, or a GPS location. Such information is used by the directory server to return a list of the stations and corresponding information back to the networked device (110). In some implementations, the networked device (110) can also perform a restricted lookup by offering more constraints such as radio type and frequency band supported by the networked device (110), in order to receive only the most pertinent information to the networked device (110). The overall process involves a single round trip delay across the Internet, which is in the order of a few hundred milliseconds in the worst case, as opposed to the time required to scan the entire spectrum for available stations—not to mention that certain information provided by the directory service, such as information about a radio station, cannot be extracted directly from a conventional airwave broadcast.

The operation of the vehicular crawler (118), the station crawler (116), the networked device (110) upload process, and the networked device (110) query process will now be described in further detail with reference to FIGS. 2-5.

Vehicular Crawler

As was described above, some implementations of the system (100) include a vehicular crawler (118). The vehicular crawler (118) is a vehicle that is equipped with software and hardware components, and which can drive along the streets of various communities and roads connecting them, to survey the availability of terrestrial broadcasts at any geographical location of the vehicular crawler (118). The vehicular crawler (118) is one example of an out of bands data collection mechanism. In one implementation, the data collection is separated into two steps, as will be described below with reference to FIG. 2. In the first step, a collection of data is obtained by the vehicular crawler (118). Then, in the second step, the data is sent to a server for processing.

Figure 2:
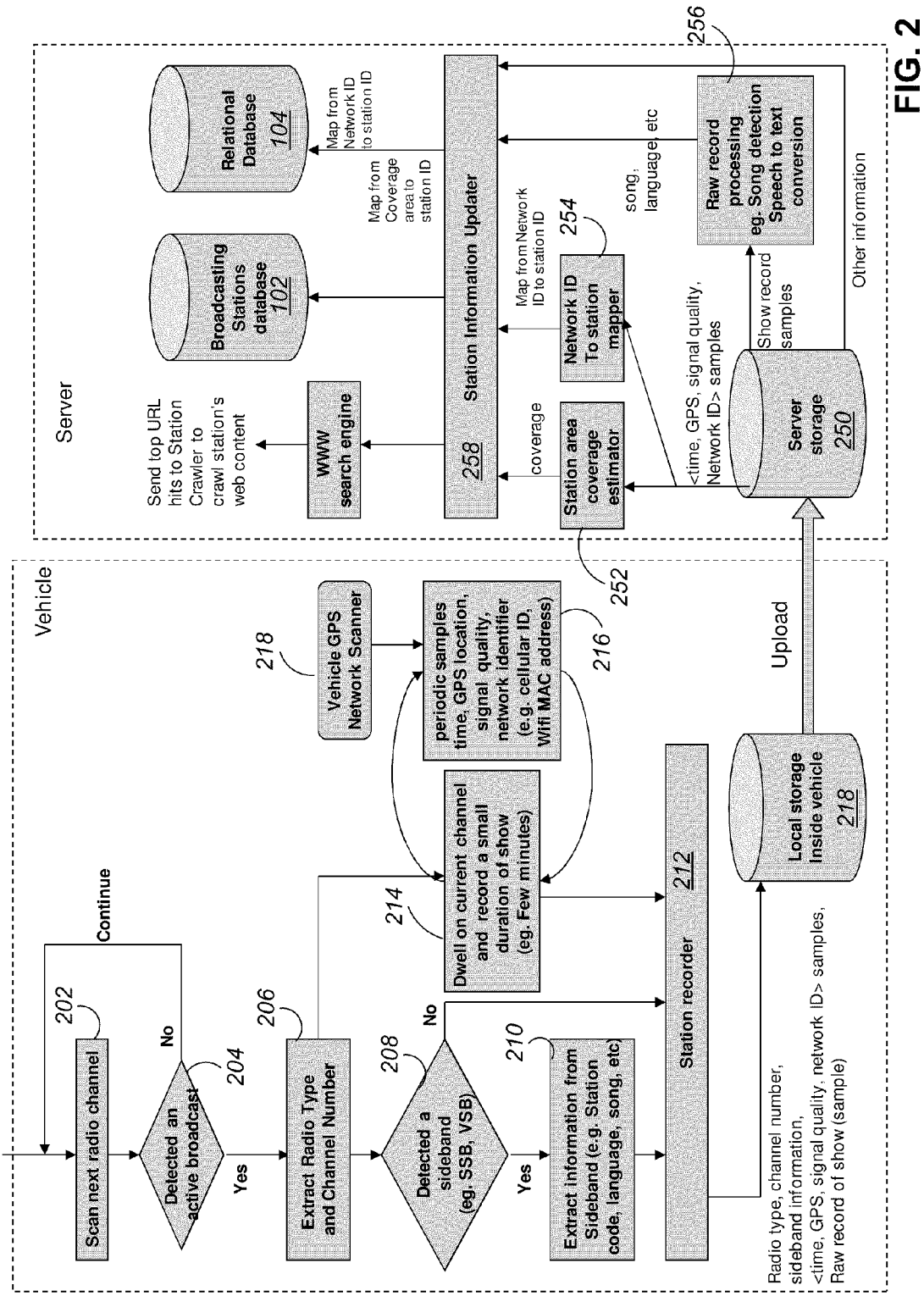
FIG. 2 shows a schematic view of the software and hardware components included in a vehicular crawler, in accordance with one implementation.

FIG. 2 shows a schematic view of the software and hardware components included in the vehicular crawler (118), in accordance with one implementation. The vehicular crawler (118) is equipped with one or more programmable radios, software defined radios, or other type of commercial radio receivers that have the capability to scan the radio spectrums for local broadcast stations.

As can be seen in FIG. 2, first a radio channel is scanned (202) and it is determined whether an active broadcast has been detected (204). If an active broadcast is not detected, a next channel is scanned (202). If an active broadcast is detected, the radio type and channel number are extracted (206). The vehicle crawler (118) also determines whether there are any sidebands (208). If sidebands are detected, the sideband information is decoded (210). The sideband information can include, for example, a station code, language, what song is currently playing, etc. The extracted information is then recorded in a station recorder (212). This is also true if no sideband information is detected.

When the radio type and channel number have been extracted, the vehicle crawler (118) dwells on the current channel and records a small duration of the current show (214). During the dwelling, various quality parameters associated with the broadcast are measured, such as signal-to-noise radio, etc., as illustrated by block 216. In some implementations, the vehicular crawler (118) has an onboard GPS (218), which allows a GPS location to be associated with the various measurements by the radio receivers.

In some implementations, the vehicular crawler (118) is equipped with network radios for scanning the radio network media to identify network IDs covering a current location (216). The results of the scanning can include parameters, such as cellular network ID and WiFi™ access point MAC address. All the periodic samples that are gathered are stored by the station recorder (212) into local storage (218) inside the vehicle crawler (118). In some implementations, the radio on the vehicular crawler (118) can be programmed such that it also records a small duration of samples of the broadcast shows and stores the samples in the local storage (218) for further server side processing.

Finally, the collected data is uploaded from the local storage (218) inside vehicle crawler (118) to server side storage (250) where the data undergoes further processing, as will now be described. The upload can either occur through online (network) or offline (removable storage) communication methods, as are well known to those of ordinary skill in the art. It should be noted that anyone who is familiar with the state of the art can choose to only implement a subset of the hardware or software modules described above, depending on the needs of the system. Further, additional networks not mentioned above can also be scanned, for example, WiMax (Worldwide Interoperability for Microwave Access), etc. Thus, there are many equivalents to the processing described above that fall within the scope of the claims.

Once the data has been uploaded to server storage (250), the data is processed by the server to organize the data in a format that can be used by a networked device (110). For example, in one implementation, a station area coverage estimator (252) estimates the footprint of the station coverage. A Network ID to Station mapper (254) establishes a mapping (i.e., collocating relationship) from each network ID to the station, where the mapping relationship indicates that the area covered by a network ID is likely to be covered by the station based on the samples.

If the samples of raw recordings are available, optionally, more sophisticated processing can be performed, such as speech to text conversion, song detection from a recorded segment and extraction of song, language, etc. (256). All of the information extracted from the data in the server storage (250) is passed to a station information updater (258) that updates the relevant information in the broadcasting stations database (102) and the relational database (104). Further, information relating to station code, channel number, etc., can be passed to a search engine, such as Google's search engine, in order to find the most relevant URLs. These URLs, in turn, can be passed to the Station Crawler (114) for further mining of the website of the corresponding stations, as will be described below.

Station Crawler

Figure 3:
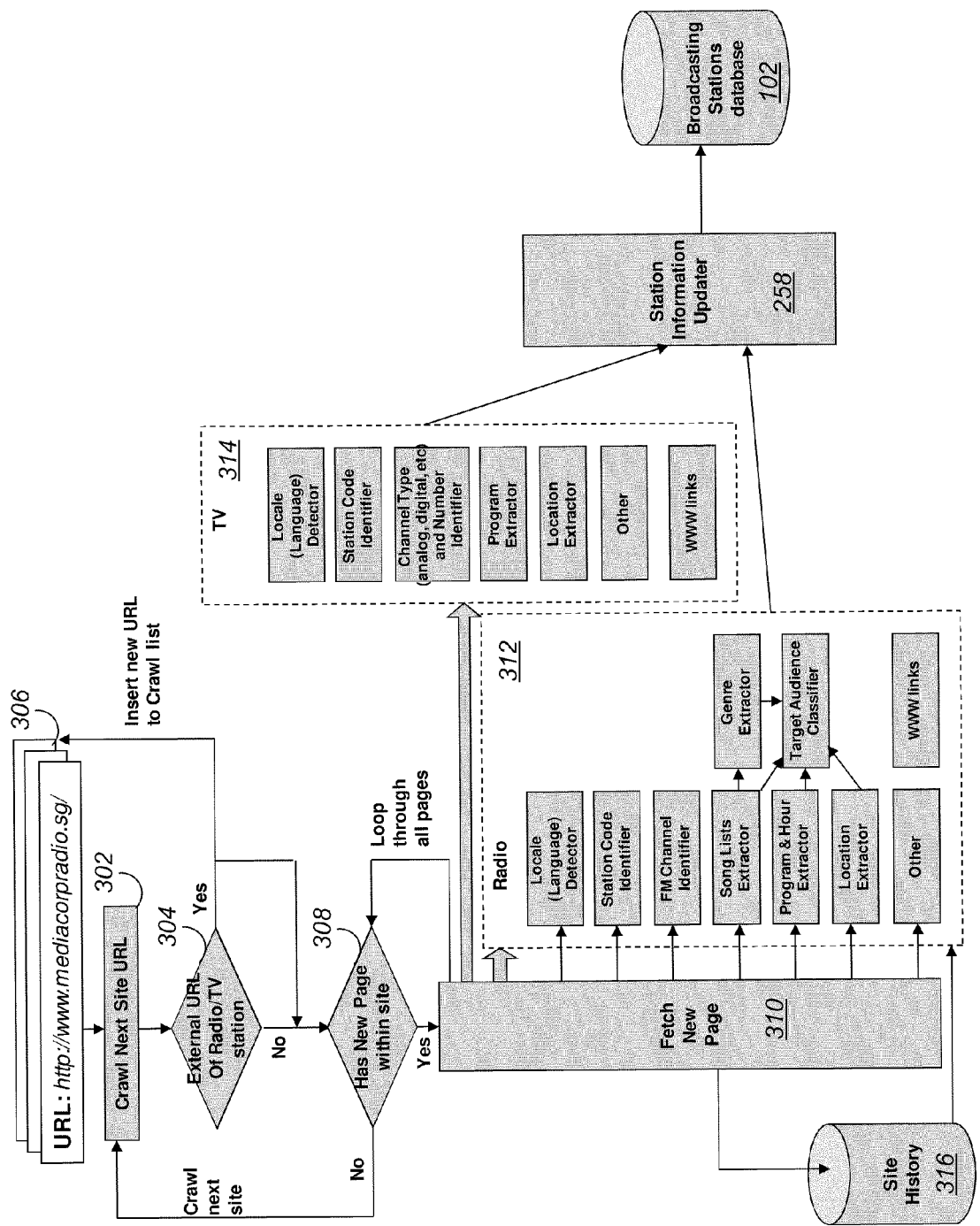
FIG. 3 shows a schematic block diagram of a station crawler in accordance with one implementation.

A schematic block diagram of a station crawler (114) in accordance with one implementation is shown in FIG. 3. The station crawler's (114) primary task is to crawl the web and find station information that can be served back to the user. The station crawler (114) first looks at a website's URL (302) and inspects its page content (304). If a new candidate URL is identified, the URL is added to a queue of URLs for crawling (306). A candidate URL can be identified, for example, from the complete and partial text matching of anchor keywords, such as digits next to "FM", "TV channel", "Broadcasting Corporation," etc. Such a pattern matching tool for detection can be easily implemented by any person having ordinary skill in the art.

The station crawler (114) also checks to see whether there are any further pages within the website (308). If no pages are found, the station crawler (114) crawls to the next website (302) in the list of URLs for crawling (306). If more pages are found within the website, the station crawler (114) fetches every page in this website (310) and sends the page content to more extractors to look for relevant information (312). For illustration purposes, the following parameters are listed in FIG. 3: locale detector, station code identifier, FM channel identifier, song lists extractor, program & hour extractor, location extractor, genre extractor and www links detector/extractor for a radio station crawling. It should however be realized that this is merely a sampling of parameters and many other parameters can also be used by the station crawler (114). The locale detector detects the language of the web page by inspecting the characters in the web page. The station code/channel detectors inspect page header, title and section titles of a page. Various heuristics can also be applied in the matching rules if there is prior knowledge about the pattern of a station code. For example, many station codes in California have a four letter acronym identifier, which begins with a "K". Alternatively, if a page contains keywords, such as "callsign", "frequency" as headers of a table, it is likely that the page contains a list of radio stations and frequencies. A station often has a short notation of frequency followed by "FM", "AM". These can all be used to extract station code and frequency.

From the frequency with which a certain callsign or frequency code appears in all pages of a website, or in the main path of an URL, it is possible to detect the main website of a station. Then the station crawler (114) can extract information such as program and hours, song lists, locations, etc. by mining specific pages. The mining can include, for example, matching strings against a database of a song, artist names, detecting tables containing time strings, and known TV drama names, actor/celebrity names, "contact us" or "about us" pages for location information, etc. Once a song list, programs and hours have been extracted, further processing of the genre of the songs and programs can be made to infer the genre of the station, such as contemporary, education, etc. This information can then be used to infer a target audience. Similar techniques can be applied to TV station crawling on the web, as shown in block 314. If a fetched page is of interest according to the above detectors, the page is saved as a snapshot in a website history storage (316).

It should be noted that the processing steps after fetching a new page are not necessarily limited to the fetched page itself. In some implementations, a website history of the page (identified by the unique URL) can be kept for past crawlings. This makes it possible to compare multiple snapshots and thereby improve the quality of the detection and inference. For example, songs broadcast by a particular broadcasting station can be combined from multiple snapshots to better infer the genre and target audience, or the program hours. Once all information is extracted, the information is combined by a station information updater (258) that updates the broadcasting stations database (102), as described above.

Mobile Upload

Figure 4:
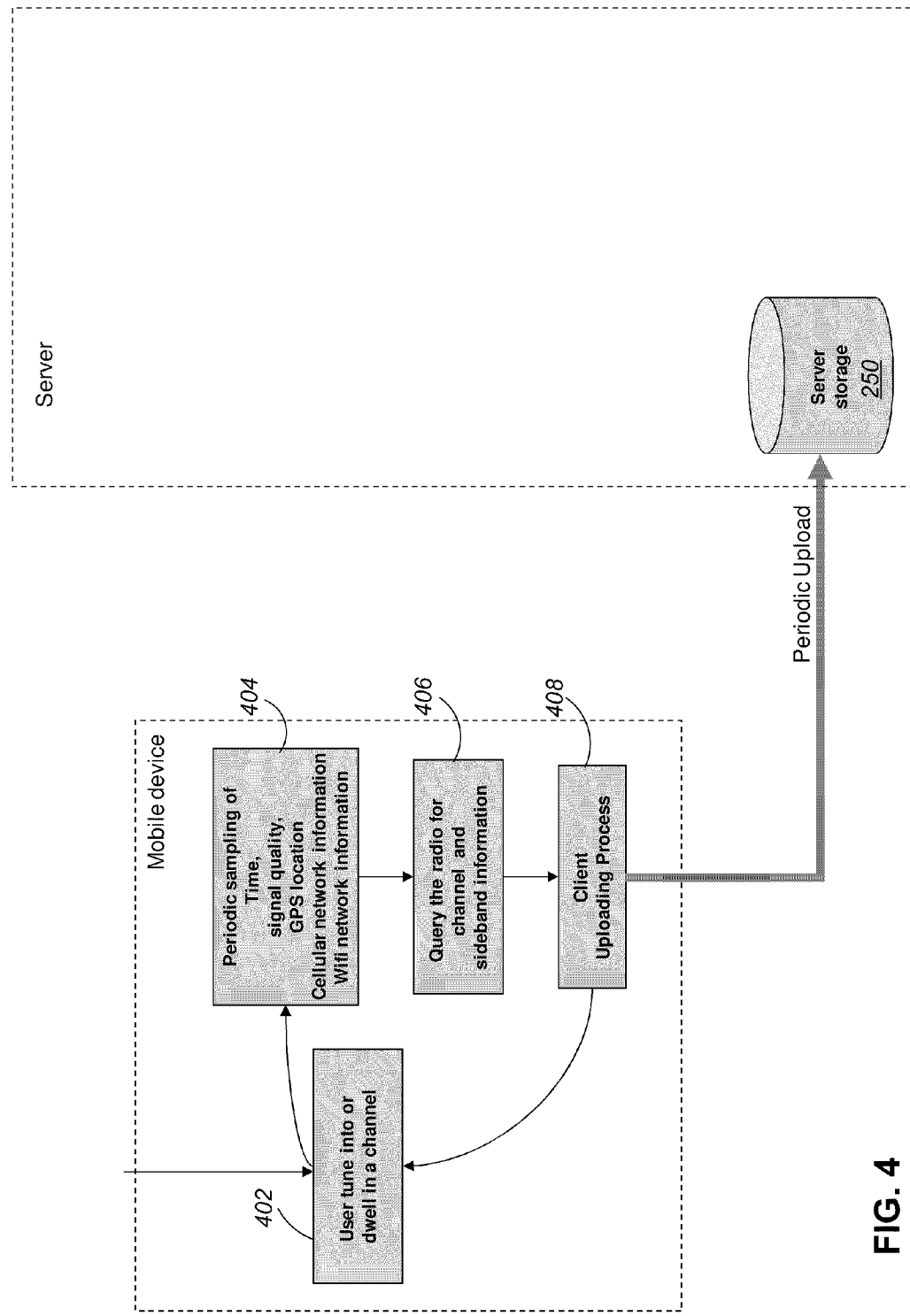
FIG. 4 shows a schematic view of the mobile upload by a networked device in accordance with one implementation.

FIG. 4 shows a more detailed view of the mobile upload (120) by a networked device (110). It should be noted that the term "mobile upload" is used here for illustration purposes only. The networked device (110) does not have to be mobile, but can also be a stationary device. The upload process begins when the networked device's (110) radio is tuned and dwells in a channel (402). The networked device (110) periodically takes samples (404; 406), similar to the sampling in the Vehicular Crawler (118). In most implementations, recordings of shows are not made by the networked device (110), since it is generally desirable to minimize the overhead of data collection at the networked device (110). However, if data collection at the client side is not an issue, recordings of shows can of course be made. The recorded data is cached periodically at the client side and uploaded (408) to the server storage (410) or when the networked device (110) has a data connection to the network. The server side processing is similar to the Vehicular Crawler (118), with the exception that some of the subcomponents described above may be optional depending on the availability of data. For example, song detection and speech to text conversion may not be necessary if the networked device (110) does not have the capability to record a part of the show, or does not have the adequate bandwidth to upload the recordings to the server (410) without adversely affecting the end user. In another example, an embedded GPS may not be available in the networked device (110), in which case the station coverage estimator is not used, due to the lack of GPS data. It should be noted that any person of ordinary skill in the art can choose to implement only a subset of the above components, or functional equivalents thereof, while maintaining a functional system with essentially the same functionality, or a subset thereof.

Mobile Query

Figure 5:
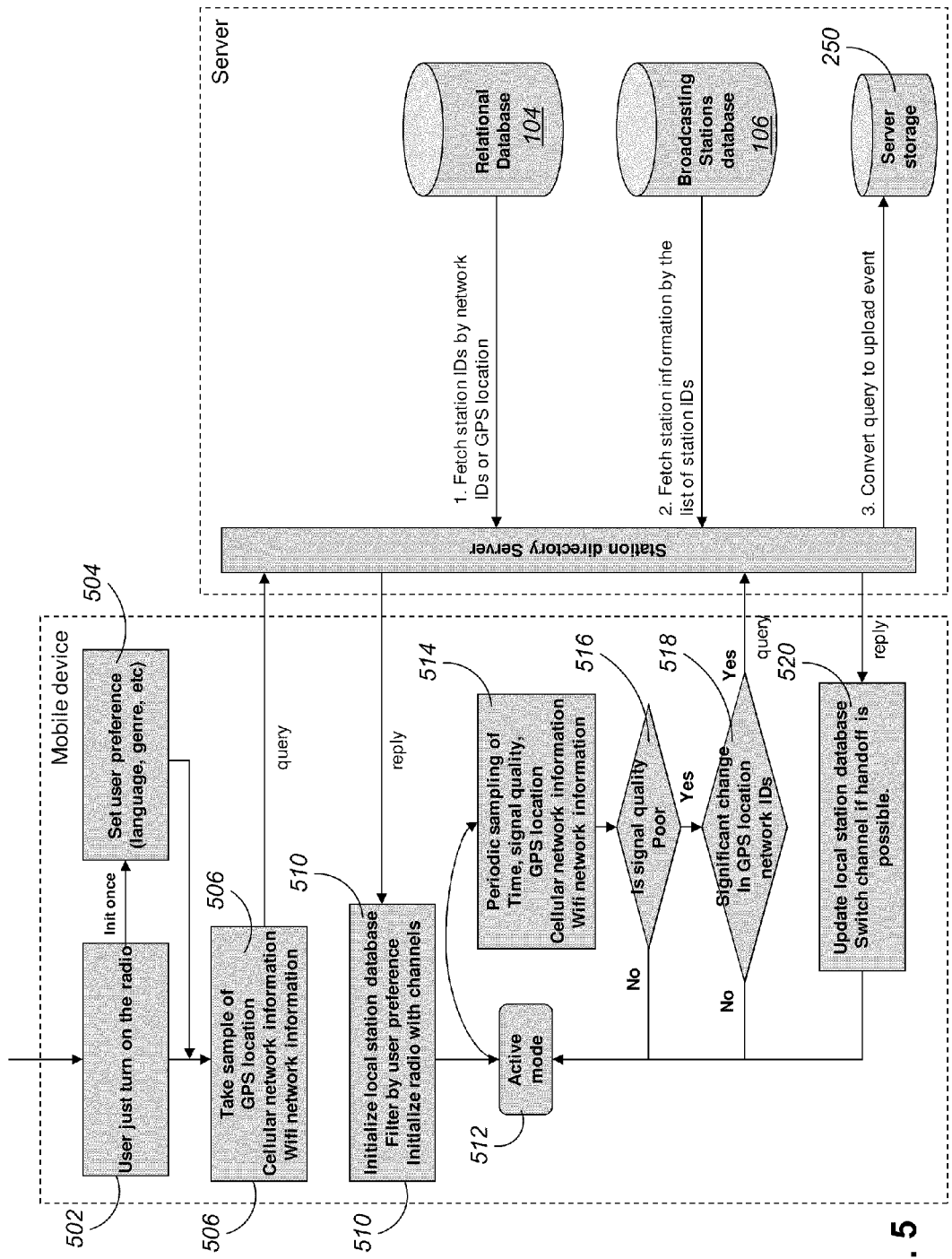
FIG. 5 shows a schematic view of how a networked device can query the directory service in accordance with one implementation.

FIG. 5 shows a more detailed view of how the networked device (110) can query the database in accordance with one implementation. First, the user turns on the radio in the networked device (110), as shown in block 502. If no user preferences have been specified, the networked device (110) asks for user preferences, such as language, genre, etc., for future channel ranking and selections (504). Then the networked device (110) takes a sample of network information by querying the network interfaces, such as cellular network ID, or WiFi™ AP list from a scan, or GPS location if GPS is available (506). Such information is included in a query (508) for station information sent to the server.

Upon receiving the query, the server looks up the relevant stations in the relational database (104) by network IDs and or GPS location. Then the server uses the list of stations to query the broadcasting stations database (102) for complete information about the stations. Finally, the server sends the information back to the networked device (110). The query itself can contain information that is useful to the system and be treated as mobile upload as described earlier. For example, when a networked device (110) sends a query for a directory service, and the query includes both cellular sector B (606) and WiFi™ access point C (608) with which the networked device (110) is associated, the query also implicitly describes the collocation of WiFi™ access point C (608) and cellular sector B (606). As was described above with reference to FIG. 6, this information is valuable to the augmentation of relational graph maintained by the system. Therefore optionally, the server can also extract such valuable data from the query and upload the data into the server storage (250) for processing, as explained above for mobile uploads.

Once receiving the reply from the server, the networked device (110) uses the station information, typically filtered based on the user's preferences, to construct the station list and to automatically program the radio receiver on the networked device (110) such that the radio receiver is ready to tune directly into any of the stations returned by the server (510). Once the user chooses a station from the list and dwells into that station, the networked device (110) enters an active mode (512). In the active mode, the networked device (110) periodically samples the signal quality of the broadcast, as well as scans the communication network media for network information, such as cellular network ID, and records GPS location as well if it is available (514). If the signal quality becomes poor (516), and the GPS location or network information has changed significantly (518), the networked device (110) sends another query to the server for assistance. The server processes such queries, just like the first query, and returns a new station list. The networked device (110) upon receiving the new station list, reprograms the radio automatically by adding newly found stations from the server, and decides whether it is possible to switch to a station with better quality (520).

The switch to a station with better quality can be done manually by the user, in response to the user being notified that the current radio signal is getting poor and that a switch to a station with better quality is recommended. The notification can be done through visual, audio, or other types of indicators that can notify the user. For stations that are part of the national networks and where a particular network is broadcasting the same program on different stations, the user can set the radio to automatically do a handoff to the new station if the new station has better quality and is broadcasting the same program as the station that the user is currently receiving.

Extensions and Alternatives

The techniques and systems described above can be extended in a variety of ways. For example, as the amount of collected information increases, signal quality and coverage maps can be generated for the various stations in the database and voids in radio coverage can be provided. Additionally, coverage of stations can be identified by a certain attribute or combination of attributes. For example, it is possible to identify whether there are stations broadcasting in Chinese about Christian religion in West Los Angeles vs. Diamond Bar. Aggregating anonymous device queries and uploads makes it possible to generate ratings based on the aggregate amount of users tuning into certain stations during certain hours and certain location. All of this information is valuable for improving service, listener/viewer ratings, and coverage for the broadcasters.

The same concept can also be used to monitor transmissions of certain frequency spectrums by the collection of networked devices (110) in a particular geographical area. For example, a networked device (110) may have the capability to detect an ongoing broadcast at all the narrow bands within the reach of its receiver's RF radio, and report the occupancy of such narrow bands back to the server. In this way, the directory server can also maintain an aggregated view of the availability or unavailability of certain frequency (narrow) band at any region within the coverage of the directory service. Such local spectrum availability or unavailability information can help centralized authorities manage the dynamic assignment or reassignment of frequency bands to a particular networked device in a region on demand. Further, the reports from other networked devices (110) in the same region also help detecting the unauthorized use of certain frequency spectrum and enforcing the compliance of frequency assignments to networked devices. Such an application may be extremely relevant and serves as foundation for managing unallocated frequency spectrums such as the TV whitespace spectrums for dynamic (re)allocation.

Various implementations allow FTA (free to air) and FTV (free to view) services to become more easily accessible to the user across the world, no matter where the users go. Through the provisioning of the directory service, a wide range of statistical information about the listener/viewers of stations across the world can also be collected and be used, for example, to publish viewing trends and to help stations optimize their programming structure to boost ratings. Thus, the directory service provides an alternative to cable network-based analytics which do not capture the FTA and FTV users.

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various embodiments employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, the various embodiments of systems described above are not restricted to a single organization. Organizations or institutions with particular advantages in different areas can implement the systems and storage fully distributed across the network and take full advantage of each others' strengths to realize their individual goals. For instance, a company A can take advantage of company B's Web search engine to implement part of the station crawler, while its own vehicular crawler can be added to an existing fleet. In essence, anyone with the known state of the art, can easily divide the aforementioned system into sub-components as those illustrated above or beyond, and choose to implement the full or partial set of the sub-components by different organizations, and yet collectively provide services equivalent to the directory service or other alternatives as claimed. Accordingly, other embodiments are within the scope of the following claims.

The invention claimed is:

1. A computer-implemented method for providing a networked mobile computing device with access to a network-based directory service for terrestrial broadcasts, the method comprising:
providing, by a computing system, the networked-based directory service, the network-based directory service including at least (i) broadcasting data for one or more broadcasting stations, the broadcasting data comprising tuning information that enables receivers to tune to one or more terrestrial broadcasts transmitted by the one or more broadcasting stations, and (ii) correlation data that correlates the one or more broadcasting stations to geographic locations;
receiving, by the computing system and from a networked mobile computing device, a request to obtain information about an availability of terrestrial broadcasts at a present geographic location of the networked mobile computing device;

querying, by the computing system, the directory service using sent geographic location as a query parameter;

transmitting, by the computing system and to the networked mobile computing device, a response that includes tuning information that enables a receiver to automatically tune to at least one terrestrial broadcast associated with sent geographic location of the networked mobile computing device;

receiving, by the computing system and from the networked mobile computing device, data that identifies (i) a plurality of geographic locations, and (ii) a plurality of broadcasting stations from which the networked mobile computing device received terrestrial broadcasts while traveling along a path that includes the plurality of geographic locations; and updating, by the computing system, the correlation data based on the data received from the networked mobile computing device that identifies the plurality of geographic locations and the plurality of broadcasting stations.

2. The method of claim 1, wherein the receiver is included in the networked mobile computing device.

3. The method of claim 1, wherein the networked mobile computing device includes one or more of: a cell phone, a radio, a television, a computer, and a portable digital media player.

4. The method of claim 1, wherein the one or more terrestrial broadcasts pertain to one or more of: radio broadcasts and television broadcasts.

5. The method of claim 1, wherein the network-based directory service is a global directory service accessible from any geographic location on planet Earth from which geographic location the networked mobile computing device is able to access the service.

6. The method of claim 1, wherein the broadcasting data includes real-time broadcasting data, wherein the real-time broadcasting data for each of the one or more broadcasting stations includes one or more of: a current program schedule and a current program being broadcast by the broadcasting station.

7. The method of claim 1, wherein the broadcasting data includes static broadcasting data, wherein the static broadcasting data for each of the one or more broadcasting stations includes one or more of: a name of the broadcasting station, a type of the broadcasting station, a code name for the broadcasting station, a language of the broadcasting station, a target audience for the broadcasting station, a station genre for the broadcasting station, a receiver type to be used for receiving broadcasts from the broadcasting station, a frequency spectrum used by the broadcasting station, tower locations for the broadcasting station, antenna transmit power for the broadcasting station, antenna height for the broadcasting station, and geographic coverage for the broadcasting station.

8. The method of claim 1, wherein the present geographic location of the networked mobile computing device is determined using one or more of: a cellular network identifier, a wireless access point media access control address, a set of global positioning system coordinates, and a navigational system.

9. The method of claim 1, further comprising using a vehicular crawler to:

travel along a second path that includes various geographic locations and collect second broadcasting data for one or more broadcasting stations available along the second path;

record geographic location data along the second path to be correlated with the second broadcasting data; and upload the collected second broadcasting data and the geographic location data to the computing system so as to cause the computing system to update the correlation data.

10. The method of claim 9, further comprising using the vehicular crawler to:

record a portion of one or more ongoing broadcasts; and upload the recorded portions of the one or more ongoing broadcast to the computing system so as to cause the computing system to update the correlation data.

11. The method of claim 1, further comprising using an authorized station upload interface to:

receive broadcasting data from broadcasting stations through a secure and authenticated network interface; and upload at least a portion of the received broadcasting data to the computing system so as to cause the computing system to update the broadcasting data for the one or more broadcasting stations.

12. The method of claim 1, further comprising using a station crawler to:

search the Internet to identify websites containing information about broadcasting data;

extract pertinent broadcasting data from the identified websites; and upload at least a portion of the extracted broadcasting data to the computing system so as to cause the computing system to update the broadcasting data for the one or more broadcasting stations.

13. The method of claim 1, wherein updating the correlation data includes:

estimating a geographic footprint for each of the one or more broadcasting stations; and storing the geographic footprint for each of the one or more broadcasting stations.

14. The method of claim 1, wherein receiving the request from the networked mobile computing device occurs in response to a user turning on or otherwise activating the networked mobile computing device.

15. The method of claim 1, wherein the request includes user preferences in addition to data that identifies the present geographic location.

16. The method of claim 15, wherein transmitting the response includes transmitting a response that contains only information satisfying the user preferences in the request.

17. The method of claim 1, further comprising:

determining, by the computing system by querying the network-based directory service, whether a terrestrial broadcast of higher quality is available compared to a terrestrial broadcast that is currently received by the networked mobile computing device; and in response to determining that a higher quality broadcast is available, notifying a user of the networked mobile computing device of the availability of the higher quality broadcast.

18. The method of claim 1, further comprising:

receiving, by the computing system and from the networked mobile computing device, a first report that includes information that specifies a presence of a first broadcasting station near a first geographic location of the networked mobile computing device;

receiving, by the computing system and from the networked mobile computing device, a second report that includes information that specifies a presence of a second broadcasting station near a second geographic location of the networked mobile computing device; and determining, by the computing system and based on the information in the first and second reports, whether respective broadcast coverage areas associated with the first broadcasting station and the second broadcasting station overlap with each other.

19. The method of claim 1, wherein the query parameter is a first query parameter, further comprising:

receiving, by the computing system and from the networked mobile computing device as a result of the networked computing device determining that a signal quality of a particular terrestrial broadcast of the at least one terrestrial broadcast associated with the present geographic location of the networked mobile computing device is poor, a second query that uses a second present geographic location as a second query parameter;

determining, by the computing system, a second response that includes second tuning information that enables the receiver to tune automatically to at least one terrestrial broadcast associated with the second present geographic location of the networked mobile computing device; and transmitting, by the computing system and to the networked mobile computing device, a second response that includes the second tuning information.

20. A computer program product, stored on a machine-readable storage medium, for providing a networked mobile computing device with access to a network-based directory service for terrestrial broadcasts, comprising instructions operable to cause a computer to:

provide the networked-based directory service, the network-based directory service including (i) broadcasting data for one or more broadcasting stations, the broadcasting data comprising tuning information that enables receivers to tune to one or more terrestrial broadcasts transmitted by the one or more broadcasting stations, and (ii) correlation data that correlates the one or more broadcasting stations to geographic locations;

receive, from a networked mobile computing device, a request to obtain information about an availability of terrestrial broadcasts at a present geographic location of the networked mobile computing device;

query the directory service using the present geographic location as a query parameter;

transmit, to the networked device, a response that includes tuning information that enables a receiver to automatically tune to at least one terrestrial broadcast associated with the present geographic location of the networked mobile computing device;

receive, from the networked mobile computing device, data that identifies (i) a plurality of geographic locations, and (ii) a plurality of broadcasting stations from which the networked mobile computing device received terrestrial broadcasts while traveling along a path that includes the plurality of geographic locations; and update the correlation data based on the data received from the networked mobile computing device that identifies the plurality of geographic locations and the plurality of broadcasting stations.

21. A system for providing a networked mobile computing device with access to a directory service for terrestrial broadcasts, comprising:

a networked-based directory service that includes (i) broadcasting data for one or more broadcasting stations, the broadcasting data comprising tuning information that enables receivers to tune to one or more terrestrial broadcasts transmitted by the one or more broadcasting stations, and (ii) correlation data that correlates the one or more broadcasting stations to geographic locations; and a directory service application program interface operable to:

receive, from a networked mobile computing device, a request to obtain information about an availability of terrestrial broadcasts at a present geographic location of the networked mobile computing device;

query the directory service using the present geographic location as a query parameter;

transmit to the networked mobile computing device, a response that includes tuning information that enables a receiver to automatically tune to at least one terrestrial broadcast associated with the present geographic location of the networked mobile computing device, receive, from the networked mobile computing device, data that identifies (i) a plurality of geographic locations, and (ii) a plurality of broadcasting stations from which the networked mobile computing device received terrestrial broadcasts while traveling along a path that includes the plurality of geographic locations, and update the correlation data based on the data received from the networked mobile computing device that identifies the plurality of geographic locations and the plurality of broadcasting stations.

* * * * *

UNITED STATES PATENT AND TRADEMARK OFFICE
CERTIFICATE OF CORRECTION

PATENT NO. : 8,255,378 B2  
APPLICATION NO. : 12/556701  
DATED : August 28, 2012  
INVENTOR(S) : Zhengrong Ji et al.

Page 1 of 1

It is certified that error appears in the above-identified patent and that said Letters Patent is hereby corrected as shown below:

First page, item (54) and column 1, line 1, title, delete "NETWORK BASED" and insert -- NETWORK-BASED --, therefor.

In the Claims:

Column 15, line 2, in Claim 1, delete "sent" and insert -- the present --, therefor.

Column 15, line 7, in Claim 1, delete "sent" and insert -- the present --, therefor.

Signed and Sealed this  
Thirteenth Day of November, 2012

David J. Kappos  
*Director of the United States Patent and Trademark Office*